United States Patent [19]
MacDiarmid et al.

[11] Patent Number: 5,645,890
[45] Date of Patent: Jul. 8, 1997

[54] PREVENTION OF CORROSION WITH POLYANILINE

[75] Inventors: Alan G. MacDiarmid, Drexel Hill; Naseer Ahmad, West Chester, both of Pa.

[73] Assignee: The Trustess of the University of Pennsylvania, Philadelphia, Pa.

[21] Appl. No.: 388,474

[22] Filed: Feb. 14, 1995

[51] Int. Cl.$^6$ .................................................. B05D 3/10
[52] U.S. Cl. ........................... 427/302; 427/307; 427/327; 427/388.1; 427/421
[58] Field of Search ................................. 427/307, 327, 427/388.1, 421, 302

[56] References Cited

U.S. PATENT DOCUMENTS

| | | | |
|---|---|---|---|
| 4,642,331 | 2/1987 | Hodge | 528/492 |
| 4,737,384 | 4/1988 | Murthy et al. | 427/369 |
| 5,006,278 | 4/1991 | Eisenbaumer et al. | 427/385.5 |
| 5,120,807 | 6/1992 | Wei et al. | 526/204 |
| 5,233,000 | 8/1993 | Yodice | 526/258 |
| 5,262,195 | 11/1993 | Moss et al. | 427/101 |
| 5,416,170 | 5/1995 | Rhee et al. | 524/398 |

FOREIGN PATENT DOCUMENTS 2119050  10/1988  Japan.

OTHER PUBLICATIONS

DeBerry, "Modification of the Electrochemical and Corrosion Behavior of Stainless Steels with an Electroactive Coating," J. Electrochem. Soc.: *Electrochemical Science and Technology*, 1985. 1022–1026 (no mo.).

Mengoli, et al., *Anodic Synthesis of Sulfur–Bridged Polyaniline Coatings onto Fe Sheets, Jounral of Applied Polymer Sciences*, vol. 28, 1125–1186 (1983) (no mo.).

Wrobleski, et al., *Corrosion Resistant Coatings from Conducting Polymers*, Polymer Preprints, vol. 35, No. 1, Mar. 1994, 264–268.

Troch–Nagels et al., *Electron Conducting Organic Coating of Mild Steel by Electropolymerization*, J. of Applied Electrochemistry, 22 (8), 756–764 (1992) (no mo.).

Hulser et al.,*Electrodeposition of Polypyrrole Layers on Aluminum from Aqueous Electrolytes*, J. of Applied Electrochemistry, 20, 596–605, (1990) (no mo.).

Beck et al., *Corrosion of Synthetic Metals*, Werkst Korros, 42 (7), 341–347, (1991) (no mo.).

Shigehara et al., *Anisotropic Electronic Conditon of Mafion–Conducting Polymer Hybrids*, Synthetic Metals, 18 721–724 (1987). (no mo.).

*Primary Examiner*—Janyce Bell
*Attorney, Agent, or Firm*—Woodcock Washburn Kurtz Mackiewicz & Norris LLP

[57] ABSTRACT

Methods for improving the corrosion inhibition of a metal or metal alloy substrate surface are provided wherein the substrate surface is coated with a polyaniline film. The polyaniline film coating is applied by contacting the substrate surface with a solution of polyaniline. The polyaniline is dissolved in an appropriate organic solvent and the solvent is allowed to evaporate from the substrate surface yielding the polyaniline film coating.

20 Claims, No Drawings

PREVENTION OF CORROSION WITH POLYANILINE

GOVERNMENT SUPPORT

Portions of this invention were supported by grant NAG 10–025 from NASA.

FIELD OF THE INVENTION

This invention relates to the prevention or inhibition of corrosion of a metallic substrate by way of a coating of polyaniline. The invention also relates to articles containing a film coating of polyaniline in accordance with the inventive methods.

BACKGROUND OF THE INVENTION

Corrosion may be defined as the effects of unwanted chemical reactions on the surface of iron and steel. Corrosion causes deterioration of the surface and structural properties of the iron component. A substantial amount of the iron currently produced is used to replace deteriorated existing structures. Thus, there is a great demand for eliminating or, at a minimum, reducing corrosion of iron and steel.

One method to inhibit corrosion is to coat the surface of the substrate with a corrosion inhibiting additive. Typical examples of such additives for inhibiting the corrosion of iron and steel are the chromates, phosphates, and silicates. They frequently are effective with stainless steel and other alloys.

Corrosion, being an electrochemical phenomenon, can be tackled through the use of electrochemistry and conducting polymers. The common method of cathodic protection, just from a theoretical stand point, cannot be the right approach, because cathodic protection requires a higher current density which cannot be provided by a conducting polymer. Anodic protection on the contrary entails current density of the order of $10^{-3}$ to $10^{-6}$ amperes per $cm^2$ which a conducting polymer is capable of imparting to the piece of iron or steel. The other important parameter is the electrical potential necessary to passivate iron or steel.

There has been recent interest in the prevention of corrosion of iron through the use of electro-active polymer coatings. Mengoli et al. performed anodic synthesis of sulfur bridged polyaniline coatings on to iron sheets by electrolyzing a basic solution of aniline and ammonium sulphide. The polymerization proceeded with avoidance of a side reaction that might lead to the contamination of the coating with azobenzene. Sulfur probably enters the polymer chains. Use of n-alkylaniline was superior because the coatings are thermally curable and show satisfying physical properties. The electropolymerization of aniline and ammonium sulphide was carried out at 4–5 V producing an insulating oligomeric film. The film was dried in an oven at 150° C. leading to cross linking consequently making it insoluble in any solvent. The film showed salt fog corrosion resistance close to 80 hrs.

DeBerry and Viehbeck showed that in a corrosive environment, electroactive Prussian blue coatings can maintain suitable metals in a passive state and can act to repassivate damaged areas. DeBerry deposited polyaniline coatings on stainless steels 410 and 430 by electrolyzing 1.0M aniline in pH 1.0 perchloric acid solution by cycling the stainless steel working electrode potential between –0.2 and +1.1 v vs. SCE at a scan rate of 50 mv/s. This resulted in the deposition of polyaniline layer in each cycle. The metal was passivated at –0.27 V in the first cycle and polyaniline was deposited at 1.0 V. The cyclic voltammogram of the deposited film in the voltage range –0.2 to +1.1 V at a scan rate of 20 mV/S in 0.2M $H_2SO_4$ showed three oxidation and three reduction peaks and the polyaniline showed reversibility of its redox behavior. The electron transfer between the iron metal and the polyaniline through the passive iron oxide layer was facile and partially responsible for the ability of polyaniline to maintain the passivity of the stainless steel. The method of corrosion monitoring was to dip the polyaniline coated stainless steel in the corrosive medium and measure open circuit voltage (Voc) vs. SCE, with time. The Voc of polyaniline coated stainless steel remained above that of bare stainless steel in aerated 2N $H_2SO_4$ for at least 50 days without breakdown. In the presence of aggressive chloride ions (0.1N $H_2SO_4$+0.1M NaCl+0.15M $Na_2SO_4$), polyaniline coated SS-430 lasted without pitting corrosion for more than 30 days. These coatings, applied by electrochemical deposition processes, are not applicable to the prevention of corrosion of most metal structures where electrochemical deposition is impractical.

The inhibition of corrosion on metallic substrates is a serious aspect of research due to the substantial economic loss associated with the corrosion of such substrates. There exists a current need to provide superior coatings and coating processes to inhibit such corrosion.

SUMMARY OF THE INVENTION

The present invention provides improved methods for inhibiting the corrosion of metal substrates by applying a chemically deposited film coating of polyaniline on an exposed surface of the substrate. The polyaniline can be applied to the substrate surface by contacting the surface with a solution containing the polyaniline dissolved in an organic solvent. The polyaniline can be in either its nonconductive base, or conductive salt (doped) form. The thickness of the applied polyaniline film coating is generally from 1–200 microns.

DESCRIPTION OF THE PREFERRED EMBODIMENTS

The term "aniline" as used herein is intended to include compounds represented by formula (1):

(1)

wherein R and R' are, independently, H, alkyl or alkoxyl having from about 1 to about 6 carbon atoms. The term "polyaniline" as used herein is intended to encompass the polymers produced upon the polymerization of the compounds having formula (1), including N-substituted derivatives thereof having alkyl or other organic functional groups attached to one or more nitrogens of a polyaniline chain.

Generally, the preparation of polyaniline comprises mixing aniline, protonic acid, and a polymerization agent or initiator in aqueous media, preferably at a temperature above about –5° C., and then recovering the resultant product from the mixture. Representative examples of such preparatory methods and the polyanilines made therefrom are shown in U.S. Pat. Nos. 5,147,913 and 5,177,187, both to MacDiarmid et al., both of which are incorporated herein in their entirety. Specifically, a polymerization agent, such as ammonium peroxydisulfate, is presented in a protonic acid solution, such as a 1M HCl solution, and this solution is added to aniline also dissolved in about 1M HCl, and the resulting solution maintained at the reaction temperature. The precipitate formed is collected and washed with about 1M HCl to yield emeraldine hydrochloride. This salt may be converted to emeraldine base by treatment with about 0.1M $NH_4OH$. Higher molecular weight polyanilines can be prepared in accordance with the procedures set forth in U.S. Pat. No. 5,276,112 to MacDiarmid et al. and in PCT application PCT/US92/09709, filed Nov. 6, 1992 to MacDiarmid et al., which are both incorporated herein in their entirety. Generally, the preparation comprises mixing aniline, protonic acid, salt, and a polymerization agent or initiator in aqueous media, preferably at a temperature below about −10° C., and then recovering the resultant product from the mixture. Useful salts include lithium chloride, sodium chloride, ammonium sulfate and mixtures thereof.

The polyaniline precipitate which is formed is collected and washed typically with protonic acid and/or organic solvent to provide a salt having, for example, formula (2), where A is an anionic species and Y is from 0 to 1. It will be appreciated that the exact formula of the polyaniline product will depend upon the particular starting materials and reaction conditions employed.

exposed surface of the substrate. This polyaniline coating effectively inhibits corrosion of the substrate due to exposure to the environment.

The metal or metal alloy substrates to which the polyaniline coating can be applied are any of those substrate materials that are prone to corrosion when exposed to the environment. Examples of such substrates include relatively pure iron, that is, substrates containing at least about 99.5% wt. iron, and steel alloys, including stainless steel alloys. Examples of common alloying elements found in such substrates include molybdenum, manganese, magnesium, chromium, silicon, copper, nickel, gold, vanadium, columbium (niobium), graphite, phosphorus, aluminum, and combinations thereof. The substrates can take the form of wires, strips, sheets, coatings, plates, beams etc.

The coating of the polyaniline onto the substrate surface can be accomplished in any manner known to those of skill in the art. Generally, the coating can be applied by contacting the substrate surface with a solution of the polyaniline. The polyaniline is preferably applied onto the substrate surface in its base form due to the increased solubility of the polyaniline base. Solvents that are useful in preparing the polyaniline base solutions include dimethyl sulphoxide, N-methylpyrrolidinone (NMP), and tetramethylurea. Solu-

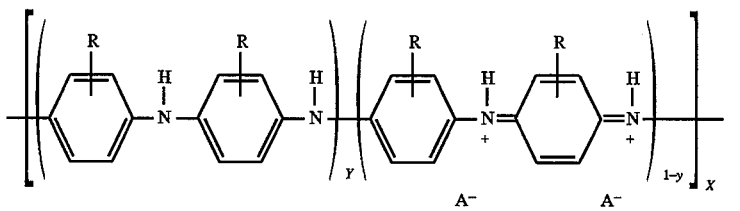

(2)

Polyaniline salts of formula (2) can be converted to bases having formula (3) by treatment with aqueous base comprising, for example, ammonium hydroxide. The resulting polyaniline base, preferably in the emeraldine oxidation state, can then be recovered by known techniques such as washing with aqueous base and organic solvents followed by vacuum drying.

tions containing about 0.5–5% wt. polyaniline are useful. The polyaniline film coating, in its base form, will undergo doping to its conductive salt form upon exposure to a corrosive, acidic environment.

The polyaniline film coating can also be applied to the substrate surface in a partially doped form; however, the partially doped polyaniline is generally more difficult to

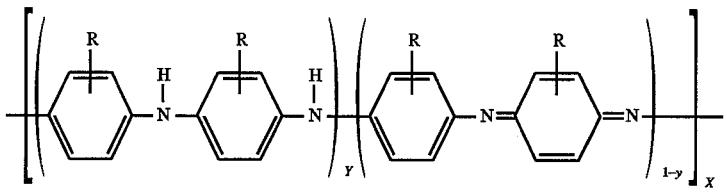

(3)

As will be recognized, it is difficult to precisely characterize polyanilines. For example, the exact position of the protonated nitrogens in the polyaniline backbone cannot be unequivocally assigned; resonance structures may be significant. It is preferred that the polyaniline salts and polyaniline bases of the present invention be generally in accordance with structures (2) or (3), respectively. It is also preferred that Y be between about 0.4 to about 0.6, as determined by titration of the polymer salt with titanium trichloride. It is particularly preferred that Y be about 0.5, as it is known that unsubstituted polyanilines wherein Y is about 0.5 exhibit greater conductivity than such polymers having different Y values.

The present invention provides for the inhibition of corrosion and rust decay of a metal or metal alloy substrate by way of providing a protecting polyaniline coating on an dissolve in a particular solvent. Useful dopant anionic species and corresponding solvents that can be used to provide a partially doped polyaniline coating include sulfonic acids, such as dodecyl benzene sulfonic acid or camphor sulfonic acid with solvents suck as toluene and substituted phenols. Preferred phenols include phenol, cresol, 3-ethylphenol, 2-chlorophenol, 2-fluorophenol, and mixtures thereof.

Coating thicknesses of from about 1 to about 200 microns, preferably from about 1 to about 100 microns, and more preferably from about 5 to about 75 microns, are believed to be useful.

The contacting of the substrate surface with the polyaniline solution can be effected by such means as spraying the surface with the solution, applying the solution to the surface by way of an instrument, such as a cloth or brush, or by immersing the surface in the solution. More than one application of the polyaniline solution may be required to build up a suitable coating thickness. The solvent is then allowed to dry from the surface of the substrate.

The tenacity of the polyaniline coating can be improved by pretreating the substrate surface with a precoating compound. Compounds found to be useful for this purpose can be functionally defined as those compounds that simultaneously bind chemically, either by way of covalent or ionic bonds, to the metal substrate surface and also to the polyaniline. Particularly preferred precoating compounds include phosphoric acid containing compounds such as phosphoric acid itself and polyphosphoric acid, and chelating agents defined as organic compounds in which atoms form more than one corrodinate bonds with metal, such as Alizarin sulfonic acid (4) and chromotropic acid (5).

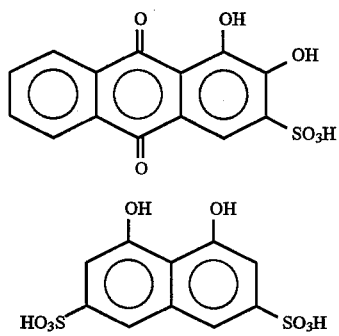

The pretreatment of the substrate surface with such pretreating compounds can be accomplished by simply contacting the surface with the compound in any conventional fashion such as by spray coating or application by way of a cloth or brush. The pretreating compound will generally be applied in the form of a diluted solution, so it is preferred to allow the substrate to dry, that is, allow the solvent to evaporate from the substrate surface, prior to coating with the polyaniline.

The thus obtained polyaniline coated substrate possesses an improved ability to withstand the harmful effects of exposure to a corrosive environment.

EXAMPLES

Example 1 POLYANILINE COATINGS WITHOUT PRETREATMENTS (a) Preparation of Polyaniline Ammonium peroxydisulfate, $(NH_4)_2S_2O_8$ (11.5 g, 0.0504 mole) was dissolved in 200 ml of 1M HCl which had been precooled to 1° C. An aniline solution (20 ml (0.219M) of aniline dissolved in 300 ml of 1M aqueous HCl) was placed in a 750 mL Erlenmeyer flask with a magnetic stirring bar and the container was placed in an ice bath on a magnetic stirring plate.

The $(NH_4)_2S_2O_8$ solution was added to the aniline solution, with constant stirring, over a period of one minute. The solution was then stirred in an ice bath for ~1.5 hours during which time the temperature remained below 5° C. Three to five minutes after the reactants were mixed, the solution started to take on a blue-green tint and then became intense blue-green with a coppery glint as a precipitate formed. The coppery glint was less pronounced after one hour.

After 1.5 hours, the precipitate was collected on a Buchner funnel (diameter 7.5 cm) using a water aspirator. The precipitate cake was washed portionwise (60 ml/portions) with 1M HCl until the initially pale violet filtrate became colorless. The liquid level was constantly adjusted so that it remained above the top of the precipitate. This prevented cracking of the precipitate cake, which would result in inefficient washing of the precipitate. A minimum of 500 mL of 1M HCl was used. This "as-made" precipitate is polyaniline in the incompletely protonated emeraldine hydrochloride form.

After the above washing, the precipitate remained under suction for ten minutes until significant cracking of the moist filter cake occurred. The filter cake was suspended with constant stirring in 500 mL 0.1M $NH_4OH$ solution. The pH of the suspended liquid brought to about 8 by the addition of 1.0M $NH_4OH$. The suspension was stirred for 15 hours. The powder was collected on a Buchner funnel (diameter 7.5 cm) and was washed with 500 mL of 0.1M $NH_4OH$ in 60 mL portions. The powder was resuspended in an additional 500 mL of 0.1M $NH_4OH$ and was stirred for one hour, collected on a Buchner funnel and washed with 500 mL of 0.1M $NH_4OH$ in 60 mL portions. The powder was partially dried under suction on a Buchner funnel for ten minutes. The moist emeraldine base powder was then transferred on the filter paper to a desiccator and was dried under dynamic vacuum for four hours. It was then pulverized by mortar and pestle and was dried further in a vacuum desiccator.

(b) Deposition of Polyaniline

A polyaniline solution was prepared by grinding the emeraldine base powder prepared in Example 1(a) in a mortar and pestle and then triturated with dimethyl sulphoxide. The mixture was filtered through glass wool and the filtrate was centrifuged and the centrifugate was lifted out with the help of a pipette. The solution was filtered through Whatman qualitative filter paper no. 2.

Strips of stainless steel, grades SS-304 and SS-430, were prepared having dimensions 1×5 cm and 16 gauge thick. These were coated with shellac on all but one face. The exposed face was cleaned with Emery paper and 600 grit paper. The strips were coated with polyaniline by dropping the polyaniline solution onto the exposed face by means of an eye dropper while the strips were in an oven maintained at 75° C. A uniform shiny blue-green coating was obtained. Cellulose tape did not lift the coating nor was it removed by washing under hot water with a gloved hand, although it could be removed by scratching with an exposed fingernail.

(c) Corrosion Bath of $H_2SO_4$

The method of corrosion monitoring used in this experiment was to measure the Voc of the coated stainless steel strip vs. SCE (standard calomel electrode) after dipping the strip in the corrosive solution. The open circuit voltage was determined versus time. The SS-304 strip was dipped in 0.4N $H_2SO_4$ of pH=4 for about twenty hours to convert the emeraldine base to sulfate salt form and subsequently dipped about 2 cm in $H_2SO_4$ of pH=5 and the Voc measured over a period of time to be about 0.1–0.2 V. After a period of one hour, a 1 cm long scratch was made on polyaniline coating on the SS-304 strip so as to open the surface of SS-304 to the action of sulfuric acid. The Voc decreased, but in a few seconds rose up again. Although the Voc showed some fluctuations, it was found to level off at −0.15 V for a period of seven days. The Voc of the base SS-304 in this solution was −0.22 V vs. SCE indicating that the polyaniline coating was preventing corrosion during the test period.

A similar experiment was repeated with SS-430. The SS-430 strip was coated with the emeraldine base as described above and placed in 0.4N $H_2SO_4$. The starting Voc was 0.5 V and decreased with time reaching a value of 0.44 V after two hours. When a deep (10×2 mm) knife scratch was made into the polyaniline coating, a decrease of 0.025

V occurred in the Voc, however in about three minutes the Voc rose again. A second knife scratch removing ½ of the polyaniline coating dipped in acid, was made after three hours but the voltage dropped only for about 2–3 minutes and rose again. The voltage stayed above bare SS-430 Voc value of –0.55 V for two days and decreased to that value as the coating peeled off. The polyaniline emeraldine coat on the SS-430 strip showed a remarkable capacity to protect the stainless steel against corrosion from 0.4N $H_2SO_4$. In the absence of coating the bare SS-430 starts to react with 0.4N $H_2SO_4$ within minutes.

(d) Corrosion Bath of Chloride

The polyaniline emeraldine base deposited SS-430 strip as described above was also tested using similar methods in a solution containing 0.2N $H_2SO_4$, 0.15M $Na_2SO_4$, and 0.1M NaCl and Voc was monitored versus time. Chloride is an aggressive ion and causes pitting corrosion and hence corrosion is quicker in its presence. In several experiments it was observed that Voc quickly (5–10 minutes) went down from 0.4 V to a low level (+0.1 to 0.0) went up a little bit and then dropped down to –0.56 V in about seventeen hours. Repeated experiments showed that emeraldine deposited from dimethyl sulphoxide solution without any pretreatment of steel did not protect the steel from pitting corrosion for an extended period. Sometimes cracking of the film was also observed.

Example 2 PRETREATMENT TESTING IN CHLORIDE BATHS (a) $H_2SO_4$/NaCl/$Na_2SO_4$ Corrosion Bath A corrosion bath similar to that in Example 1(c) was used in similar testing using a SS-430 polyaniline emeraldine coating. Various precoating treatments were applied to the SS-430 strip prior to the coating with the polyaniline. The cleaned and polished SS-430 strip was dipped in dilute aqueous sulfuric acid for 15 seconds, washed for a few seconds with acetone, allowed to dry, then dipped in one of the following precoating solutions for about 1 minute: (a) chromic acid; (b) a mixture of $H_3PO_4$/$(C_2H_5O)_4Si$; (c) aqueous solution of sodium salt of alizarin sulfonic acid; and (d) aqueous solution of sodium salt of chromotropic acid. The precoating was allowed to dry and washed briefly with water, allowed to dry, and then coated with the solution of polyaniline emeraldine base. The results of the tests are set forth in Table 2.1 indicating the number of days the Voc was held above the Voc for the uncoated SS-430 strip.

TABLE 2.1

| Pretreatment | Days VOC > VOC Control |
| --- | --- |
| Chromic acid | 4 |
| $H_3PO_4$/$(C_2H_5O)_4Si$ | 5 |
| Alizarin | 9.5 |
| Chromotropric | 17 |
| $H_3PO_4$ | 12 |

(b) $H_2SO_4$/NaCl Corrosion Bath

A corrosion bath containing 0.4N $H_2SO_4$ and 0.2M NaCl was used in similar testing using a SS-430 polyaniline emeraldine coating. Various precoating treatments were applied to the SS-430 strip prior to the coating with the polyaniline. The preatreatments were applied in a similar fashion as those set forth in Example 2(a). The coatings and the results of the tests are set forth in Table 2.2 indicating the number of days the Voc was held above the Voc for the uncoated SS-430 strip.

TABLE 2.2

| Pretreatment | Days VOC > VOC Control |
| --- | --- |
| Alizarin | 6 hours |
| Chromotropric Acid | >1 |
| $H_3PO_4$ | <1 |

(c) HCl Corrosion Bath

A corrosion bath containing 0.1N HCl was used in similar testing using a SS-430 polyaniline emeraldine coating. Various precoating treatments were applied to the SS-430 strip prior to the coating with the polyaniline. The preatreatments were applied in a similar fashion as those set forth in Example 2(a). The coatings and results of the tests are set forth in Table 2.3 indicating the number of days the Voc was held above the Voc for the uncoated SS-430 strip.

TABLE 2.3

| Pretreatment | Days Voc > Voc Control |
| --- | --- |
| Alizarin | >53 |
| Chromotropric Acid | >51 |
| Polyphosphoric Acid | >29 |

What is claimed is:

1. A method of improving the corrosion inhibition of a metal or metal alloy substrate, comprising applying to an exposed surface of an iron or steel alloy substrate a coating of polyaniline, wherein said application of said polyaniline is accomplished by contacting said substrate surface with a solution comprising said polyaniline dissolved in an organic solvent.

2. The method of claim 1 wherein said polyaniline is applied in a partially doped, electrically conductive form.

3. The method of claim 1 further comprising doping said polyaniline coating.

4. The method of claim 3 wherein said doping is accomplished by exposing said coated substrate to a corrosive environment.

5. The method of claim 1 wherein said polyaniline is applied in the base form.

6. The method of claim 5 wherein said polyaniline is in the emeraldine base form.

7. The method of claim 6 wherein said organic solvent for said polyaniline comprises N-methylpyrrolidinone, dimethyl sulphoxide, tetramethylurea, and mixtures thereof.

8. The method of claim 6 wherein said polyaniline coating is from about 1 to about 200 microns in thickness.

9. The method of claim 6 wherein the application of said coating is achieved by spraying said polyaniline solution onto said substrate surface.

10. The method of claim 6 further comprising contacting said substrate surface with phosphoric acid or polyphosphoric acid prior to applying said polyaniline coating.

11. The method of claim 6 further comprising contacting said substrate surface with a chelating agent prior to applying said polyaniline coating.

12. The method of claim 11 wherein said chelating agent comprises alizarin sulfonic acid or chromotropic acid.

13. The method of claim 6 further comprising doping said polyaniline coating.

14. The method of claim 13 wherein said doping is accomplished by exposing said coated substrate to a corrosive environment.

15. A method of improving the corrosion inhibition of a metal or metal alloy substrate, comprising:

(a) providing an iron or steel alloy substrate having a surface;

(b) contacting said substrate surface with a solution comprising polyaniline dissolved in an organic solvent;

(c) removing the solvent to form a protective coating of the polyaniline on the substrate surface;

(d) exposing the polyaniline coated, substrate surface to a corrosive environment;

wherein said protective coating is effective to inhibit the corrosion of the substrate surface.

16. The method of claim 15 wherein said polyaniline coating is from about 1 to about 200 microns in thickness.

17. The method of claim 15 wherein the polyaniline is in the emeraldine base form.

18. The method of claim 15 further comprising contacting said substrate surface with phosphoric acid or polyphosphoric acid prior to applying the polyaniline coating.

19. The method of claim 15 further comprising contacting said substrate surface with a chelating agent prior to applying the polyaniline coating.

20. The method of claim 19 wherein the chelating agent comprises alizarin sulfonic acid or chromotropic acid.

* * * * *